Dec. 6, 1932.  E. WHITE  1,890,104

MAGNETIC INDUCTION MACHINE

Filed July 28, 1930  4 Sheets-Sheet 1

INVENTOR
ELI WHITE
BY
ATTORNEY

Dec. 6, 1932.  E. WHITE  1,890,104
MAGNETIC INDUCTION MACHINE
Filed July 28, 1930  4 Sheets-Sheet 3

INVENTOR
Eli White
BY
ATTORNEY

Dec. 6, 1932.  E. WHITE  1,890,104

MAGNETIC INDUCTION MACHINE

Filed July 28, 1930  4 Sheets-Sheet 4

INVENTOR.
Eli White
BY
ATTORNEY

Patented Dec. 6, 1932

1,890,104

UNITED STATES PATENT OFFICE

ELI WHITE, OF DETROIT, MICHIGAN

MAGNETIC INDUCTION MACHINE

Application filed July 28, 1930. Serial No. 471,173.

This invention relates to magnetic induction machines and the object is to provide such a machine having no coils on the moving parts.

Another object is to provide a magnetic induction machine of a new and simplified construction eliminating the use of collector rings and brushes, and it is further an object of the invention to so construct the machine as to practically eliminate losses from hysteresis.

An additional object of the invention is to provide a magnetic induction machine fundamentally adapted for directly generating alternating current and that may, by means of a commutator and brushes as hereinafter described, be utilized to generate direct current.

It is further an object of the invention to provide a magnetic induction machine of simplified construction for generating alternating electric current in which the generating units may be embodied in a manner to provide alternating current of one- two or three phases, and further one in which the voltage of the generated current may be varied.

An additional object of the invention is to provide a magnetic induction machine which may act as a single, double or triple phase generator and further one in which a series of the generating units may be utilized each of which may be utilized to deliver current to its own load line independently of the others.

An additional object and feature of the invention is to provide a magnetic induction machine of a simplified construction having no moving coils and so arranged that the magnetism causing rotation may act on the circumference of a rotor of large diameter thus providing a motor of powerful torque.

More specifically the object of the invention is to provide an electrical device consisting of a rotor having a series of spaced segments of magnetic material and one or more magnets, hereinafter termed surge units, preferably of a four-pole type, two of which are north pole and two of which are south pole, between which these segments move in succession with the segments so arranged that when one pair of pole pieces are covered by a segment the other pair are not so covered.

The magnet may be energized by means of a field coil as by means of a separate exciting dynamo and when one of the magnetic segments is between two opposed pole pieces the lines of force generated by the field coil pass through the segment from one pole piece or arm to the other. The only magnetic lines that will pass through the opposite pair of pole pieces will be such as can pass through the air gap between the faces of the pole pieces which are spaced a considerable distance apart whereby the magnetic lines of force passing through the latter magnetic circuit will be relatively small as compared with those passing through the first mentioned magnetic circuit.

By rotation of the rotor the magnetic segment leaves the first mentioned pole pieces and a succeeding air space comes opposite the same as the magnetic material moves into the space between the second set of pole pieces. Thus, the magnetic lines of force are caused to surge through the last two pole pieces and to leave the first two. By continuous rotation of the rotor therefore it will be seen that there is a continuous surge alternately through the two pairs of pole pieces of the surge unit and current may be taken off through the surge coils the voltage of which is proportional to the speed of the rotor and to the net number of lines of force transferred from one pair of pole pieces to the opposite and thus an alternating current is generated which can be delivered to the load line in the usual manner.

The aforesaid objects and novel features of the invention are hereinafter more fully described and claimed, and the preferred form of construction of an electric generator or motor embodying my invention is shown in the accompanying drawings which are more or less diagrammatic in character and in which—

Fig. 1 is a section taken on line B—B of Fig. 2, showing a part of the rotor and magnet or surge unit.

Fig. 2 is a sectional view taken on line

A—A of Fig. 1 showing the relationship of the magnet pole pieces and the rotor.

Figures 1, 2:
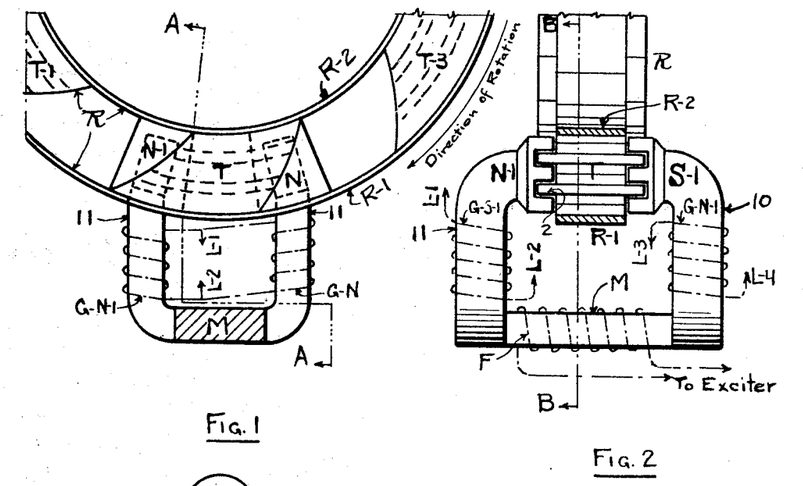

The general principle of the machine is illustrated in its simplest form in Fig. 1 in which a portion of the rotor indicated at R is shown in its general relation with a magnet M. It is to be understood that the rotor R is mounted to be revolved by any approved means when used as a generator and is a complete circle in form. The rotor consists of the two bands, the external band R—1 and the internal band R—2 which may be of brass, aluminum or other non-magnetic material. These bands support the magnetic segments T, T—1 and T—3 which are preferably of steel. These magnetic segments are of equal size and are equally spaced around the rotor leaving spaces between of approximately equal size and form and the spaces between the magnetic elements are either air spaces or are filled with a non-magnetic material or in some manner closed as by means of a sheet of non-magnetic metal extending between the two rings R—1 and R—2 and covering these spaces.

The purpose of thus filling or enclosing the spaces between the elements T, T—1 etc., is to reduce the air resistance to rotation. The segments T, T—1 etc., are preferably of sheets of metal or laminations and of a form such as shown at 2 in Fig. 2 which is a cross section of the rotor through one of the segments. It will there be seen that its opposite faces are grooved and that the oppositely disposed pole pieces of the magnet or surge unit M are likewise grooved, the purpose being to reduce the reluctance of the air path between the pole faces and the rotor segments due to the larger area offered to the flow of magnetic lines of force.

A second purpose of the grooves or serrations is to offer a larger perimeter to the lines of force passing in a tangential direction between the rotor and the radial surface of the poles, this being especially efficient when the machine is operated as a motor. Such grooves or serrations are not absolutely essential as the pole faces and the magnetic elements T of the rotor may have plane faces in close proximity to each other. The pole faces are also shown much larger in area than the cross section of the surge arms in order to still further reduce the reluctance of the air path between the pole faces and the rotor segments.

The surge unit is of peculiar form, it consisting of the body portion shown at M in cross section in Fig. 1 and in elevation in Fig. 2 and from one end of this body extends two arms 11, 11 having pole faces N and N—1 on one side of the rotor while the opposite pole pieces S and S—1 are on the opposite end of the body M, one of which is shown at 10 in Fig. 2. The pole pieces S and S—1 are in a directly opposed relation to the pole pieces N and N—1 respectively. Two such pole pieces N—1 and S—1 are shown in Fig. 2. Thus, this magnet has four poles, two north pole pieces and two south pole pieces in opposed relation and the magnetic elements T, T—1 etc., of the rotor pass between these pole pieces successively as the rotor is rotated. The elements T, T—1 and T—3 etc., of the rotor are exactly alike in construction and have the forward and rear edges curved in form toward the direction of rotation of the rotor as indicated by the arrow in Fig. 1. The object of the curvature of the ends of the segments is three-fold; first, it is necessary in order to divide the pole faces diagonally into two equal areas; second, by varying this curvature, the curve of the generated voltage may be varied; and third, it does away with the possibility of a dead center position for the rotor when used as a motor as will be described later.

Figure 15:
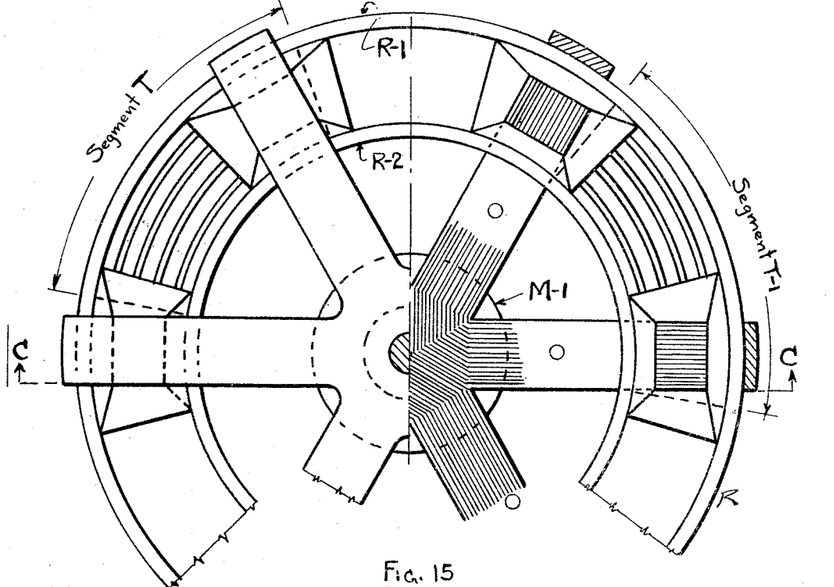
Fig. 15 is a half plan view and half sectional view showing the arrangement of the surge unit interiorly of the rotor instead of exteriorly thereof in which one central field magnet operates all the surge units. An alternative form of rotor segments are shown on this view in which the ends of the rotor segments are formed by radial planes.

A rotor segment having its ends formed by radial planes, as shown in Fig. 15, may be used in which case the voltage generated will be nearly uniform in intensity. This form of segment would be especially advantageous where the machine is used to generate direct current as the intensity of the voltage generated would be more uniform than with segments having curved ends.

The arrangement of the curved rotor segments (see Fig. 1) is such that as the element T for instance passes between two of the pole pieces, one of which is shown at N in Fig. 1 and which will be understood as being opposed by pole pieces S of the opposite end of the magnet, the form of curve is such that when the outer end is opposite the left hand corner of a pole face the inner end of the curve will be opposite the inner right hand corner of the pole face as shown in Fig. 1 which thus serves to divide the pole faces into two equal areas and thus with the magnetic flux of the poles N and S decreasing due to the turning of the rotor the magnetic flux is increased between the other pole pieces N—1 and S—1 of the same magnet, and it will further be noted that, due to the fact that these segments are spaced apart by an area of practically the same area and contour as each segment, when a rotor element T passes from the position shown in Fig. 1 so that the rear curved face occupies the same position relative to the pole pieces N—1 and S—1 as it does occupy relative to the pole pieces N and S in said Fig. 1, the next succeeding segment T—3 is passing in between the pole pieces N and S.

It is to be noted that the segments and surface contour are so designed that the total area of the segment in a plane parallel with the pole faces and immediately opposite said pole faces is always constant and equal to the total area of one pole face. By this arrangement the total flux through the field coil is constant and counter electro-motive force in the field coil is prevented. The magnetic path is thus increased and decreased in each pair of poles of the magnets in succession and this tends to cause a surge of the magnetic lines of force first through the one pair of pole pieces and then through the other. The magnet M is preferably provided with a field coil F connected with an exciter or other source of direct current and the portions 10, 10 and 11, 11 of the magnet are provided with what I have termed surge coils, the two arms 11 carrying the north pole pieces having the coils thereof connected together, as shown in Fig. 1, while those coils GS and GS—1 of the south pole pieces are connected together having the terminals L—3 and L—4 and these may be connected to an outgoing supply line for the delivery of electric current to a distance. These coils may be connected in parallel or in series or the coil of each surge unit may be connected to its own load line. When the coils are connected in parallel the voltage is that of one coil. When they are connected in series the voltage is that of the combined coils.

Figure 3:
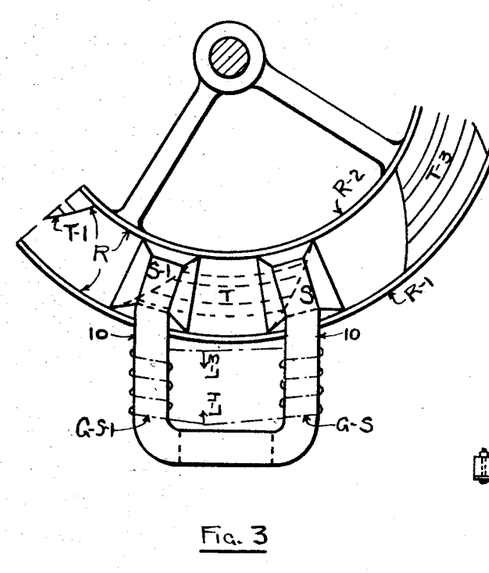
Fig. 3 is a side elevation showing the magnet and a portion of the rotor.
Figure 4:
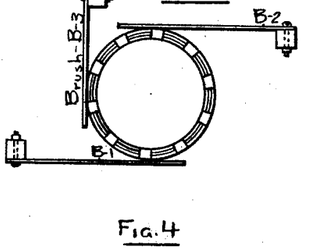
Fig. 4 is a view of the commutator used where direct electric current is desired.
Figure 5:
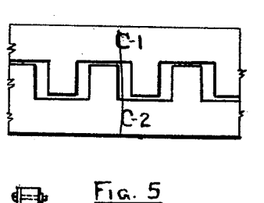
Fig. 5 is a development of a portion of the surface of the commutator.

The basic principle of the invention is illustrated in Figs. 1, 2 and 3 from which it will be seen that the magnetic lines of force are caused to traverse a magnetic circuit through the pole pieces continuously in one direction and current is induced in the several coils enclosing the pole pieces due to variable magnetic flux caused by revolution of the rotor with its alternating magnetic and non-magnetic portions.

Figures 12, 13:
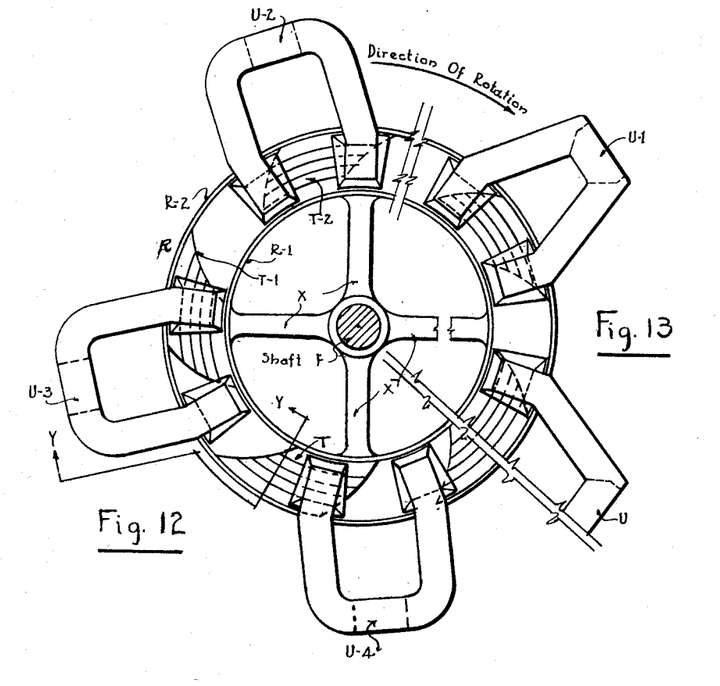
Fig. 12 is a view similar to Fig. 3 showing the use of a plurality of magnets or surge units in conjunction with the rotor only a portion of which is shown.
Fig. 13 is a similar view of an alternative form of magnet by means of which the magnetic circuit is shortened.
Figure 14:
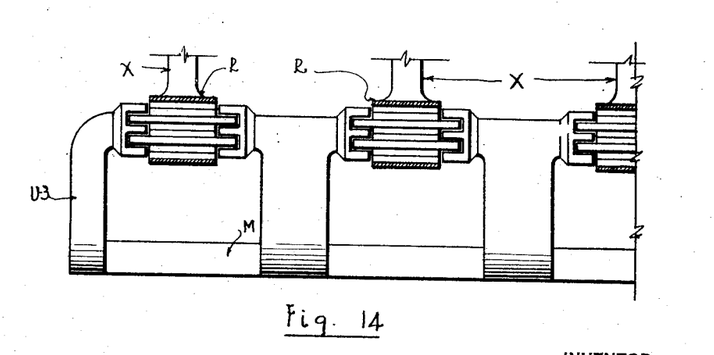
Fig. 14 is an alternative form of construction in which there are a plurality of rotors with a common axis having surge units provided with three or more pole pieces in the same axial plane.

A series of magnetic surge units may be used about the rotor as indicated in the adjacent Figs. 12 and 13. Fig. 12 shows three units U—2, U—3 and U—4 of a character shown and described in Fig. 1 while Fig. 13 shows a unit having a form of pole pieces with a shorter magnetic circuit. The fundamental operation, however, is identical in either of these cases in the generation of an alternating current and due to the position of the magnets and the fact that more than one generating unit can be utilized in connection with the same rotor alternating currents of one or more phases may be produced depending on the arrangement of the surge units with relation to the rotor segments. As shown in Fig. 14 the rotor may have a plurality of rings carrying magnetic segments all connected with a single shaft by the arms X. In such case the units U—2, U—3 and U—4 are formed with pole pieces between these separate rings and the revolution of the shaft causes these rings and their segments to revolve between successive groups of pole pieces. By the arrangement shown in Fig. 14 the current output may be increased in proportion to the number of rotors added to the shaft.

Figure 16:
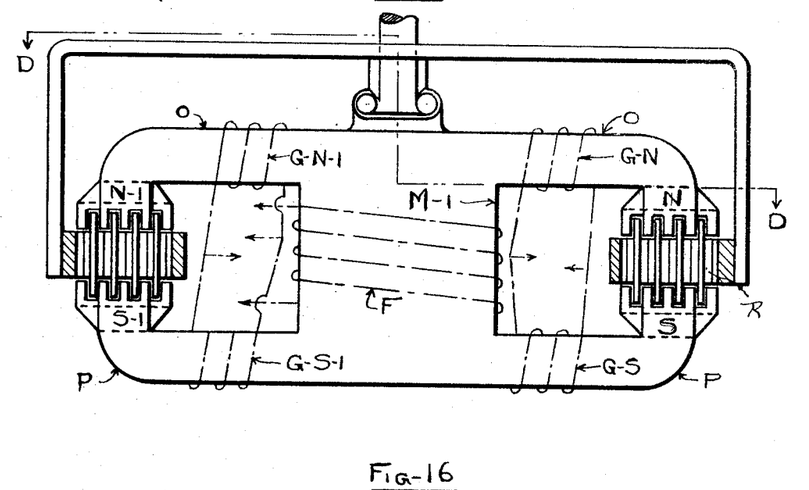
Fig. 16 is a section of the machine taken on line C—C of Fig. 9.

Instead of the surge units being external they may be arranged internally as shown in Figs. 15 and 16 in which case there is only one magnet M—1 with a series of arms O extending therefrom providing the north pole pieces and similar arms P extending from the opposite end of magnet M—1 forming the south pole pieces and the pole pieces and the rotor of this construction are alike in their relationship and are similar to those shown in Fig. 1, heretofore described, and this magnet also has the field coil F and the several coils GN, GN—1, GS and GS—1 for the relative north and south pole pieces.

It is to be understood that the rotors in each of the cases cited are supported by a shaft, one arrangement of which is shown in Figs. 15 and 16, to which power may be applied in rotating the rotor and that the magnets are stationary while the rotor is revolved. It will be understood that in any of the forms of the invention herein shown, the magnetic flux surges alternately from one pair of pole pieces to a second pair of pole pieces whereby current is generated in the several coils wound on these pole pieces.

The speed of rotation of the rotor, due to the arrangement of parts described, determines the voltage and when used as an alternating current generator, no commutator or collector rings or brushes are required and also that the polarity of the poles never changes and that the total combined flux through the two sets of pole pieces and hence through the field coil F remains approximately constant, and that there is only a magnetic surge increasing or decreasing the relative number of lines of force in the pole pieces without reversing the polarity and that the invention may be arranged to generate alternating currents of one- two or three phases. This latter feature is best illustrated in Fig. 12 which shows the three surge units U—2, U—3 and U—4 so arranged with relation to the rotor R that the current generated by the segment T is one-third of a wave length in advance of that generated at the same instant by the segment T—1. With this arrangement of the several units a three-phase current may be generated and by increasing the space between the units U—2, U—3 and U—4 the machine may be arranged to generate a two-phase current.

Several objects and advantages are attained by this invention. The rotor is constructed entirely of metal and has no conductors on it and hence it is much simpler to balance and is less costly to manufacture. The generating units are so constructed that there is never any reversal of magnetism thus greatly reducing losses from hysteresis.

The machine may be operated for producing alternating current without any commutator, collector rings or brushes thus avoiding expense and operating losses associated with such devices. The machine may be quickly changed to generate one, two or three-phase current by simply varying the respective positions of the several units. The generated voltage for the same speed of revolution may be varied according as to whether the coils are connected singly, or in series, with the form shown in Figs. 1 and 2 this voltage may be varied 400 per cent. By using a plurality of surge units as shown in Fig. 13 the voltage may be increased to any percentage desired depending on the total number of surge units used.

One of the advantages obtained by my improved construction is that the generating coils can never be short circuited to an extent that would cause a damaging surge of current. This results from the fact that the total number of amperes on the generating coil multiplied by the number of turns of the generating coil (known as ampere turns) can never be as great as the ampere turns on the field coils.

This is due to the fact that when the ampere turns on the surge coil approaches that on the field coil the magnetism in the surge arm is reduced to zero and no current can be generated.

In Figs. 6 to 11 I have shown a series of wiring diagrams to illustrate how direct current may be generated and how a plurality of circuits may be provided and voltage varied and the structure utilized as a motor.

Figures 6, 7, 8, 9, 10:
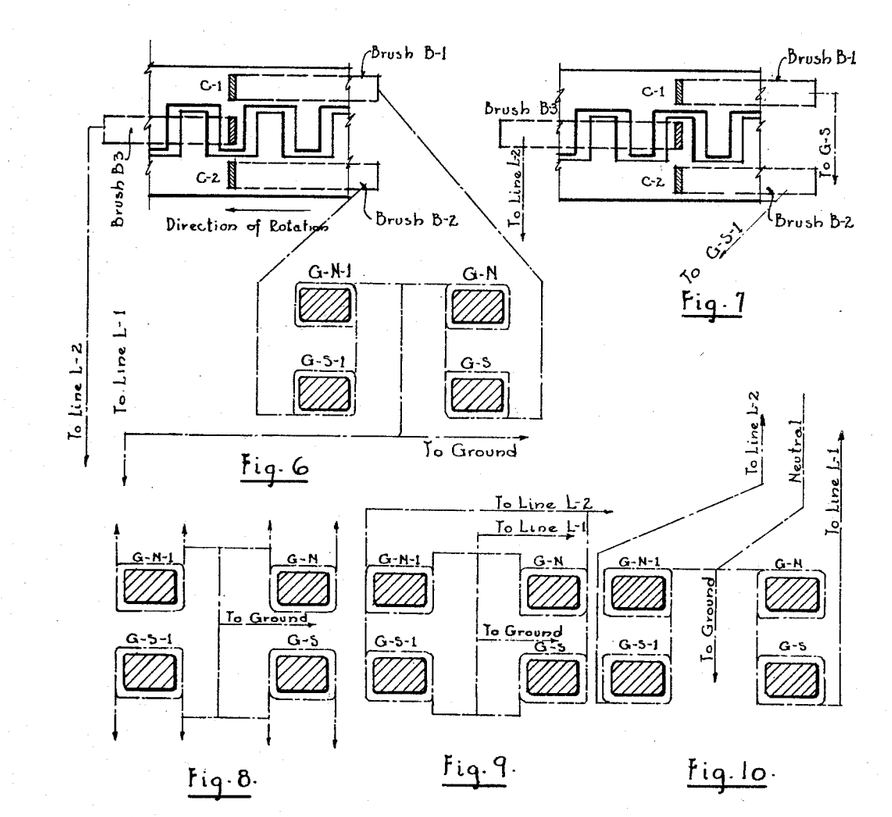
Fig. 6 is a developed view of a portion of the commutator including a wiring diagram for the machine in which the coils are connected in series and shows the connection to the brushes illustrating how a direct current can be taken therefrom.
Fig. 7 is a similar view with the commutator turned a distance equal to the length of one rotor segment.
Fig. 8 is a diagram showing the generating coils connected to provide four circuits one circuit for each generating coil and having the center leads grounded.
Fig. 9 shows the generating coils connected in parallel under which condition the total voltage of the generated current is equal to the voltage of a single coil and the amperage is equal to the sum of the amperes generated by the four coils.
Fig. 10 is a diagram showing four generating coils arranged for three wire connections each pair of coils being connected in series thus giving a voltage equal to the combined voltage of two coils. The neutral or ground wire is taken off from the connection between the two pairs of coils.

Fig. 6 shows a wiring diagram arranged for generation of direct current. The diagram shows the four generating coils connected in series with a neutral wire taken off from the connection joining GN—1 and GN, this neutral wire being carried to the ground, and also forming one side of the line. The two outer wires connecting to GS—1 and GS are carried to brushes B—1 and B—2. This figure shows the center brush B—3 bearing on the segment which connects to ring C—1, and thence to brush B—1. In this position current will flow from coil GS through brush B—1 into ring C—1, thence into brush B—3 and out onto line L—2; a working current being taken off between lines L—1 and L—2.

When the rotor has turned through a distance equal to the length of one segment, brushes B—1, B—2 and B—3 will then be in position as shown in Fig. 7. In this position, the current will then come from generating coil GS—1, pass to brush B—2, thence to ring C—2 and out onto brush B—3, and thence to line L—2.

It will be noted by the use of this connection that the generating coils are only connected to the line one-half of the time. In other words, only at such time as the current would be passing in a positive direction out into line L—2.

Fig. 8 shows the four coils connected separately when no commutator is used, in which case four distinct circuits could be employed to take the current generated by the coils.

Fig. 9 shows the coils connected in parallel without the use of any commutator, in which case the center connections of the four coils are grounded. With this form of connection, unless the curve of the alternating current generated by all four coils is in exact synchronism, there would be a loss of current, as compared with the amount of current generated by the arrangement shown in Fig. 8.

Fig. 10 is probably the most practical way of connecting the coils without the use of a commutator, as I have positive assurance that the curves of the current generated in coils GN—1 and GS—1 are identical, and the curves of the current generated in GN and GS are identical. Hence, there is no possibility of loss, and by grounding the central or neutral wire, the difference of voltage between the wire winding and the iron of the cores is kept at a minimum; likewise, I have the advantage of saving in copper for a three-wire system of wiring. In this method, the voltage is equal to the voltage generated on each pair of surge coils.

With reference to operation of the machine as a motor, this can be accomplished in several different ways. It can be operated as a motor by feeding current to lines L—1 and L—2, as shown in Fig. 6, in which case coils GN and GS will be first energized, there being no current passing through coils GN—1 and GS—1. The magnetism in these coils will cause the rotor to move the length of one segment to a position directly between pole pieces of GN and GS, at which time brush B—3 will then be connected to ring C—2, and the current will be cut off from coils GN and GS and turned on to coils GN—1 and GS—1, thus again pulling the rotor another segment length forward to a position between these pole pieces, and this operation continues indefinitely while current is applied to lines L—1 and L—2.

With the segments curved as shown there is never a possibility of a dead center for the rotor, since the forward pull on the outer point of a rotor segment being on a larger radius than any backward pull that might come to a segment from the poles which it is leaving, causes the forward torque to exceed the backward torque by the difference in the ratio of the radii.

Figure 11:
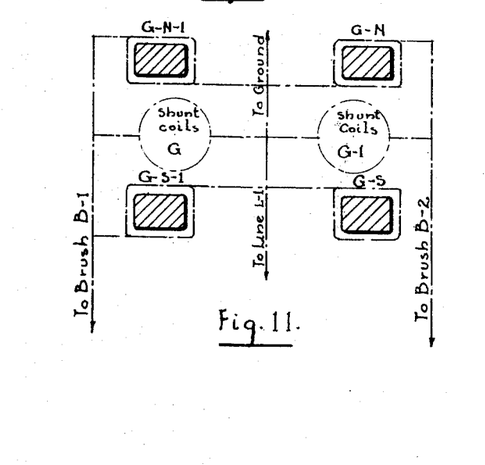
Fig. 11 is a diagram showing one method of connecting the surge coils when used as a motor.

The second method of connections in which the field coil enters into play is shown in Fig. 11. The field coil is not shown in this figure, but same would be energized by a portion of the current; the balance of the current would enter the surge coils alternately through the connections shown as brush B—1 and brush B—2, from the arrangement of the commutator as shown in Fig. 6, the current being supplied to line L—1 and line L—2, with the center connections between the coils grounded as indicated, and connected to line L—1. In this diagram, the shunt coils G and G—1 are indicated by dotted circles. These are to be wound on the four surge arms or pole pieces GN, GS and GN—1, GS—1 respectively, so that a part of the current entering into GN—1 and GS—1 is diverted to shunt coil G, which is wound on the surge arms GN and GS, passing around in a direction to generate magnetism opposed to that already produced in these arms as a result of the field coil, and reducing this magnetism practically to zero, when the magnetism in GN—1 and GS—1 is at a maximum.

By this means the magnetism on the segment between pole arms GN and GS is reduced to practically zero, while magnetism on pole arms GN—1 and GS—1 has a maximum intensity equal to the sum of that produced by the surge coils of these pole arms and the field magnet, which would tend to pull one of the rotor segments between them, thus moving the brush to the position shown in Figure 7, when the current would come to the surge coils through brush B—2, thence into coils GN and GS, making the magnetism in these arms of maximum intensity. The current would at the same time pass through shunt coil G—1, thereby repressing or reducing to zero the magnetism in surge arms GN—1 and GS—1; the combined condition of magnetism in the four surge arms then drawing the rotor forward the length of another segment. The operation would continue indefinitely while current was being supplied to lines L—1 and L—2.

The connection of surge coils, as shown in Figure 9, may be used to operate the device as a synchronous alternating current motor without the use of a commutator. In this case a small amount of direct current would be required to energize the field coil. The connections are such that when the current passes in one direction from line L—2 to L—1 it will, for example, add to the magnetism produced in poles N and S by the field coils and it will subtract from the magnetism in poles N—1 and S—1. Then when the cycle is reversed the opposite result will occur, namely the intensity of magnetism in poles N—1 and S—1 will be increased to a maximum while the magnetism in pole pieces N and S is decreased to a minimum.

This sequence of change in intensity will alternately draw the magnetic segments of the rotor between the intensified pole pieces causing rotation of the rotor until the segments synchronize in their motion with the cycles of alternating current.

The arrangement of surge units, as shown in Fig. 12, is adaptable for use as a three-phase motor. In this case the field magnets of units U—2, U—3 and U—4 would be energized by a direct current and an alternating three-phase current would have each separate phase connected in succession to units U—2, U—3 and U—4 respectively such that the alternating current would add to the magnetism produced by the field coil in one pair of pole pieces and subtract from the magnetism produced in the other pair of pole pieces. With the phases connected in proper sequence to the surge units there will result an intensity of magnetism in one pair of pole pieces of each unit that will pull the segments between the pole pieces thus causing rotation of the rotor. To secure this result the magnets are grouped in multiples of three as indicated in Fig. 12 and each have two pairs of pole pieces in such relation that the distance between the pairs of pole faces of each magnet measured circumferentially is one-half the length of the rotor segment and the distance between the groups is five-sixths of the length of the rotor segment. This arrangement of the pairs and groups applies to the arrangement of magnet having the central body and the radially disposed pole pieces as well as to the form of magnet shown in Fig. 12.

The advantage of this invention when the device is operated as a motor are as follows: First, the armature is constructed entirely of metal and has no conductors on it, hence it is much simpler to balance and manufacture; second, the surge units operate on the outer circumference of a rotor which has no magnetic coils. Consequently, this rotor can be built of any reasonable desired diameter thereby producing a slow speed motor having very much higher torque than can be practically obtained with the ordinary ring or drum type of direct current armature.

From the foregoing description it is believed evident that the various objects of the invention are attained by the construction and arrangement of the parts described, that is; simplicity of construction in that no coils are used on moving parts; that loss from hysteresis is practically eliminated, and that the device may be arranged to generate alternating current of one, two or three phases and through use of a commutator may be used to generate direct current and may also be utilized to act as a motor operating through use of direct current or an alternating current of one, two or three phases, and further that a motor of slow speed is provided having powerful torque.

Having thus fully described my invention, what I claim and desire to secure by Letters Patent of the United States is—

1. In a magnetic induction machine, a magnet having a series of pole arms in pairs, a field coil for energizing the same, a series of generating coils, at least one for each of the pole arms and completely enclosing the same, a rotor including a series of segments of magnetic material alternating with sections of approximately equal size non-magnetic and non-conducting in character positioned between the said pole arms and through rotation of which, as one magnetic segment is opposite one pair of pole arms a non-magnetic section is between a succeeding pair, said segments being so arranged that only one magnetic segment may be opposite a pair of pole arms at any time the arrangement providing a structure in which continued rotation of the rotor causes a surge of magnetic lines of force first through one set of pole arms and then through the other thereby generating current in the generating coils.

2. In a magnetic induction machine, a magnet having a plurality of pairs of pole arms in spaced relation, a field coil associated with the magnet and carrying direct current to thereby cause flow of the magnetic lines of force continuously in one direction through the pole arms, a series of generating coils, at least one for each of the pole arms and enclosing the same, and a rotor consisting of a series of magnetic and non-magnetic sections of equal size and form rotatable between the pole arms to thereby cause a flow of magnetic lines of force first through one pair of pole arms, and then through another as the magnetic and non-magnetic sections pass the same in sequence said magnetic and non-magnetic sections being so arranged that only one magnetic section may be opposite a pair of pole arms at a time.

3. In a magnetic induction machine, a magnet having a series of pole arms in pairs in radial relation with the body of the magnet, a field coil for said magnet which by energization causes magnetic lines of force to pass continuously in one direction through the pole arms, a rotor consisting of a ring rotating between the series of pole arms, the said ring including a series of magnetic and non-magnetic sections of equal size and form in alternate relation through rotation of which the magnetic lines of force are caused to surge in the said pole arms, and a series of surge coils at least one for each of the pole arms in which current is induced by the said surging, and a load circuit with which the coils are associated.

4. In a magnetic induction machine, a rotor consisting of a ring formed of two concentric bands of non-magnetic material, a series of segments of magnetic material supported between the bands in spaced relation whereby the ring consists of a series of magnetic and non-magnetic sections, a magnet having two pairs of pole arms in opposed spaced relation between which the magnetic and non-magnetic sections of the ring pass in succession through rotation of the rotor, a field coil for energizing the magnet, and coils of insulated wire on the pole arms in which current is induced through the surging of the lines of magnetic force across the pole arms and producing an alternating electric current in each of the coils, and means for conducting the generated current from each of the coils.

5. In a magnetic induction machine, a rotor including a series of magnetic and non-magnetic sections in alternate relation, both said sections having the same surface form, the magnetic sections having the forward and rear ends formed on a curve inclined toward the direction of rotation whereby the outer end of the magnetic section is circumferentially in advance of the inner end of the section, a magnet consisting of two pairs of pole arms in spaced relation between which the rotor sections pass, a field coil for energizing the magnet, surge coils on the said pole arms whereby through rotation of the rotor the magnetic lines of force are caused to surge in the pole arms in alternate relation inducing alternating current in the coils, the magnetic sections being so arranged and spaced by the non-magnetic sections that the total area of magnetic sections opposite the pole arms of the magnet is constant and equal to the total area of one pole face.

6. In a magnetic induction machine, an electro-magnetic stator having a common field portion, pole arms thereon providing a plurality of separate incomplete magnetic circuits, a coil of insulated wire completely encircling each pole arm an armature therefor consisting of alternate sections of magnetic and non-magnetic material so relatively located with reference one to the other and to the pole arms that movement thereof relative thereto will consecutively assist in completing and interrupting the magnetic flow in the incomplete magnetic circuits so that, while the flow through the separate incomplete magnetic circuits varies in intensity, the flow through the field portion remains practically constant.

7. In a rotary magnetic induction machine, an electro-magnetic stator having a common central or field portion, a coil of insulated conducting wire for magnetizing the same, pairs of pole pieces projecting from said field portion and forming a plurality of separate and incomplete circuits for magnetic flux, a series of coils of insulated conducting wire each completely encircling each pole piece, a rotor having alternate sections of magnetic and non-magnetic material approximately equal in size so relatively located one to the other and to the stator pole pieces that through revolution of the rotor said alternate sections consecutively assist in completing and interrupting the magnetic circuits of the separate pairs of pole pieces whereby surges of magnetic flux are caused through the pole pieces and coils therefor and the magnetic flux through the field portion is maintained practically constant, the parts being so arranged that the surges of magnetic flux cut the coils of the pole pieces thereby generating alternating current, and means for conducting current separately from each coil to a load line.

8. In a rotary magnetic induction machine, an electro-magnetic stator having a common central field portion of magnetically permeable material, a series of pole pieces in pairs projecting therefrom to form a plurality of separate incomplete circuits for the flow of magnetic flux, a series of coils of insulated conducting wire each encircling a pole piece, a rotor formed of alternate sections of magnetic and non-magnetic material of approximately equal size so relatively located one to the other and to the stator pole pieces that as an electric current is alternately delivered to and cut off from the coils of the pole pieces, the magnetic sections of the rotor are drawn into the circuits of the magnetized pole pieces thereby causing rotation of the rotor, the arrangement of the parts providing that the magnetic flux of the central or field portion of the stator remains practically constant.

9. In a rotary magnetic induction machine, a central magnetically permeable portion, pole pieces in pairs thereon, a series of coils of electrically conducting wire one on each of the pole pieces, a rotor having segments of magnetic and non-magnetic material approximately of equal size, the forward end of each segment at its outer circumference projecting beyond the inner circumference and the rear of the segment projecting at its inner circumference beyond the plane occupied by the outer circumference whereby upon operation as a motor the forward torque caused by the pull of the forward pair of magnetized pole pieces exceeds the retarding torque of the rear pair of pole pieces.

10. In a rotary magnetic induction machine, an electro-magnetic stator having a common central or field portion, a coil of insulated conductor wire for magnetizing the same, a plurality of pairs of pole pieces projecting from the central portion each forming separate incomplete circuits for the flow of magnetic flux, a series of coils of insulated wire each encircling a pole piece, a rotor having alternate segments of magnetic and non-magnetic material of approximately equal size and form so relatively located one to the other and to the stator that a constant magneto-motive force produced on the field portion by a continuous direct current produces equal magneto-motive force on the pole pieces whereby an alternating current connected to the coils of the pole pieces will on the positive side of the wave add to the magneto-motive force of one pair of pole pieces and detract from the magneto-motive force of the adjacent pair thereby drawing a magnetic segment of the rotor into the circuit having the higher magneto-motive force and the following negative wave will reverse conditions again drawing the rotor segment forward to the adjacent pole pieces which then have the higher magneto-motive force thus increasing the speed of revolution of the rotor until it comes into synchronism with the frequency of the alternating current.

11. In a rotary magnetic induction machine, an electro-magnetic stator having a central magnetic permeable portion, pole pieces thereon, a series of coils of electric conducting wire at least one for each pole piece, a rotor composed of alternate magnetic and non-magnetic segments, a commutator mounted on the rotor comprising two rings of conducting material each having alternately projecting segments intermeshing with and insulated one from the other, a series of three stationary brushes so positioned that two of the brushes bear on the respective ring portions of the commutator and the third bears on the intermeshing segments of the commutator whereby direct current may be alternately directed to successive coils of the pole pieces thereby causing revolution of the rotor.

In testimony whereof, I sign this specification.

ELI WHITE.